Fig. 3

L. W. YAGGY.
ADDING MACHINE.
APPLICATION FILED JULY 15, 1911. RENEWED MAR. 11, 1914.

1,122,052.

Patented Dec. 22, 1914.
9 SHEETS—SHEET 7.

Witnesses
Inventor
L. W. Yaggy

L. W. YAGGY.
ADDING MACHINE.
APPLICATION FILED JULY 15, 1911. RENEWED MAR. 11, 1914.

1,122,052.

Patented Dec. 22, 1914.
9 SHEETS—SHEET 9.

L. W. YAGGY.
ADDING MACHINE.
APPLICATION FILED JULY 15, 1911. RENEWED MAR. 11, 1914.

1,122,052.

Patented Dec. 22, 1914.
9 SHEETS—SHEET 9.

Witnesses

Inventor
L. W. Yaggy
By
Attorney

UNITED STATES PATENT OFFICE.

LEVI W. YAGGY, OF NEW YORK, N. Y., ASSIGNOR TO WALTER E. YAGGY.

ADDING-MACHINE.

1,122,052.  Specification of Letters Patent.  Patented Dec. 22, 1914.

Application filed July 15, 1911, Serial No. 638,669. Renewed March 11, 1914. Serial No. 824,063.

*To all whom it may concern:*

Be it known that I, LEVI W. YAGGY, a citizen of the United States, residing at New York, in the county of New York and State of New York, have invented certain new and useful Improvements in Adding-Machines; and I do hereby declare the following to be a full, clear, and exact description of the invention, such as will enable others skilled in the art to which it appertains to make and use the same.

My invention relates to adding machines. Its object is to provide a machine so small and compact that it may readily be placed and used upon the book or paper bearing the data, may add by the column, and yet contain all the mechanism necessary to accurately perform the work of addition and also print the result.

To this end my invention comprises the combination of features, parts and details set forth in the appended claims. A power-transmitting and motion converting mechanism, a counter-wheel mechanism and controlling features, and a printing mechanism are arranged in separable sections in line upon a skeleton-base through which the printing wheels may print. The unit key-bars are arranged in transverse groups of three and any key may operate a common power-transmitting mechanism which may operate through rotary gear mechanism any selected counter-wheel and corresponding printing wheel. Each group of key-bars imparts a movement of different length to the power transmitting device (in this case a slide-bar) and each movement gives an equivalent impulse to a pinion and, through a pawl carried by the pinion, to a ratchet and attached gear. A permanent stop is provided to determine the impulse given by the "9" key-bar, but for each of the other impulses is provided a movable stop operated by the key-bar, which catches the rotary pawl of the ratchet and gear and stops the movement to give exactly the necessary rotation to the counter-wheel and printing wheel gear. In short, the parts are so related that the impulses are first broadly measured and then specifically determined enabling one then to instantly start and suddenly stop and quickly return the parts without injury or inaccuracy.

The counter-wheels and the printing-wheels operate synchronously and the counter-wheels are controlled by mechanism operated individually by the movement of a carriage, that controlling mechanism being in correlation with a controlling mechanism of the printing-wheels.

For each counter-wheel there is a corresponding coupling-wheel which may engage with specially provided teeth of two of the counter-wheels and cause inter-action, and for each printing-wheel there is an impression lever or a printing-lever and a corresponding setting-lever for each of the impression or printing-levers, so that as the carriage moves from one denomination to another the counter-wheel controlling mechanism will be set and will in turn operate the setting-levers so that the printing-levers will be in position to receive the blow of a hand plunger which operates in the rear of the machine and all printing-wheels corresponding to the counter-wheels which have been passed or which have been operated will make an impression or imprint of the total when the hand plunger is struck.

In the accompanying drawings.

1 is the base-plate of the machine which may rest immediately upon the book or paper containing the data. The base-plate is, as illustrated, of skeleton form for purposes to be hereinafter set forth (Fig. 3).

2 is the front, 3 the rear end, and 4 the inclined top of a casing which, preferably, entirely incloses the mechanism, excepting for the projecting key-bars and a printing lever, and which is cut away, as indicated, to permit a reading of the counter wheels.

Figure 2:
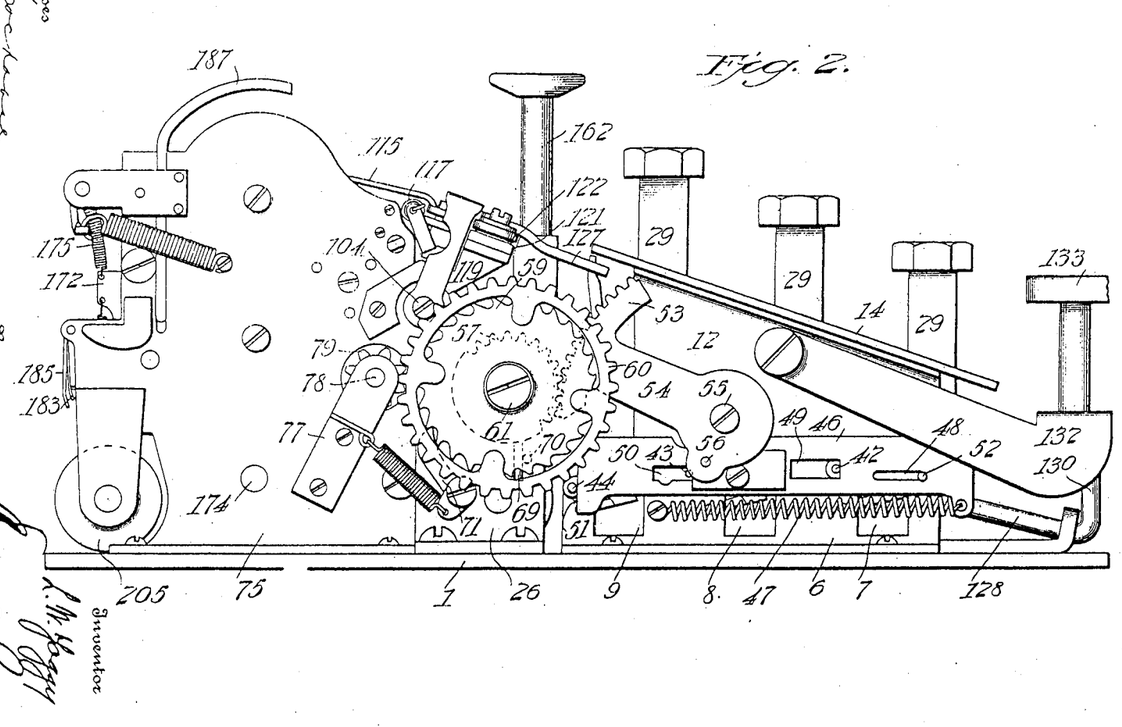
Fig. 2 is an elevation of the power-transmitting device.
Figure 3:
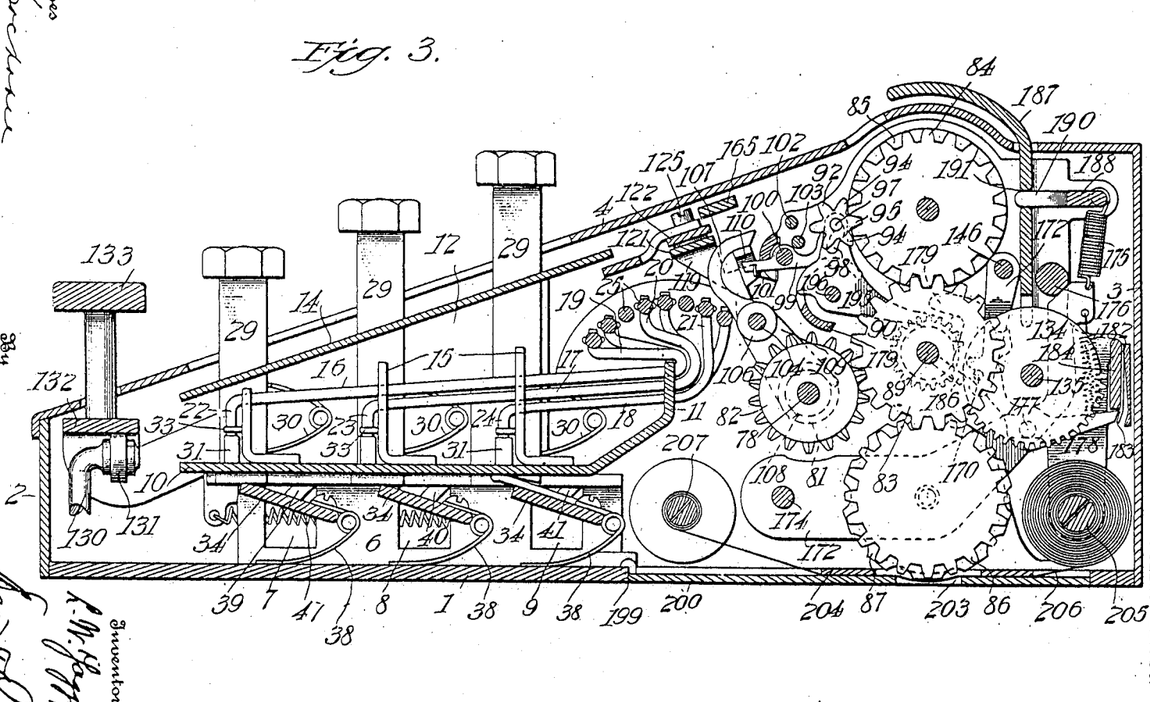
Fig. 3 is a longitudinal section with the casing in place.
Figure 4:
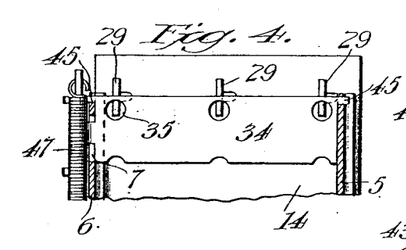
Figs. 4, 5, 6 and 7 are details of the connections immediately operated by the key-bars.
Figure 12:
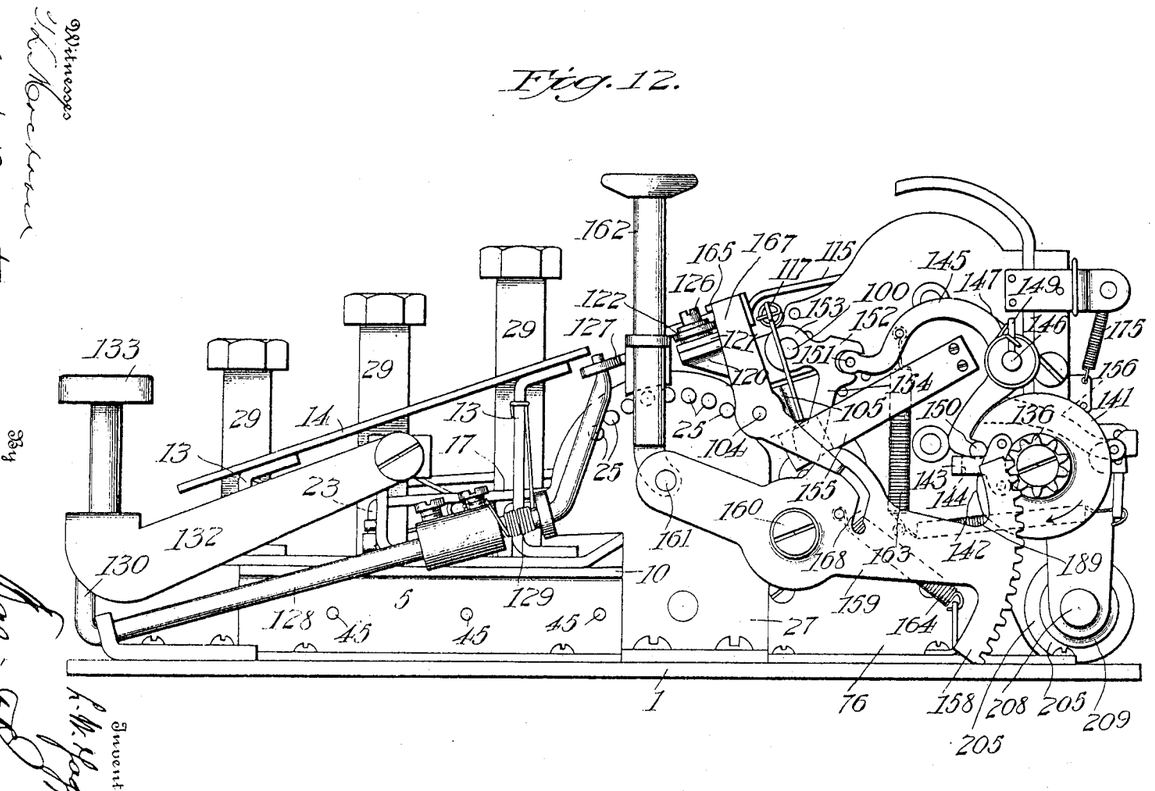
Fig. 12 is an elevation of the zero-returning side opposite to that of Fig. 2.

A flanged plate 5 on one side and a similar plate 6 on the other side are secured to the base-plate and form vertical supports and bearings, the plate 6 being cut away at 7, 8 and 9 to permit the play of parts to be hereinafter described (Figs. 12, 2 and 3). Upon the plates 5 and 6 lies a horizontal plate 10, perforated at intervals to receive the feet of a series of key-bars, and having an upwardly bent extension 11. On one side, in line with plate 6, is a supporting and bearing plate 12, and on the opposite side a series of standards 13, the plate and standards carrying an inclined plate 14, perforated in line with the perforations in plate 10 to receive and guide the several key-bars. In transverse line with the standards 13 is a series of shorter standards 15, likewise secured to the plate 10. Each of these standards 13, 15 is perforated to receive rocker-rods 16, 17, 18 of different lengths, the rocker-rods having, respectively, curved bent ends 19, 20, 21, passing through perforations in the extension 11, and each of the rocker-rods having, respectively, downwardly bent parts 22, 23, 24 at the opposite end. Each rocker-rod reciprocates a stop-rod 25, there being, in illustrated form of my machine, eight of these stop-rods.

26, 27 are standards secured to the base of the machine, perforated at the top to receive the ends of the stop-rods 25, and serving also as bearing plates for parts to be hereinafter described. The ninth stop may, of course, be permanent and is shown at 28 on the side of the standard 26.

29, 29 represent the key-bars, each of which has a spring-return 30.

31 represents a part struck up from the shank of each key-bar, leaving an opening 32 in the key-bar.

33 is a stop on the side of each standard 15.

The opening 32, the projection 31 and the stop 33 regulate the action of each of the stop-rods 25. That is to say, when a key-bar 29 is depressed it will force to one side the downwardly bent part, 22, 23, or 24, which engages with that key-bar, turning the stop-rod so that the forward upwardly bent part, 19, 20, or 21 will be oscillated and thus reciprocate the respective stop-rod 25.

Figure 5:
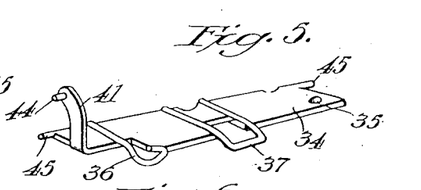
Figure 6:
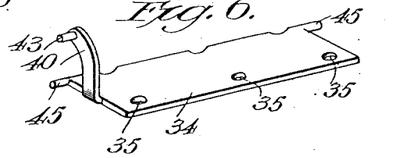
Figure 7:
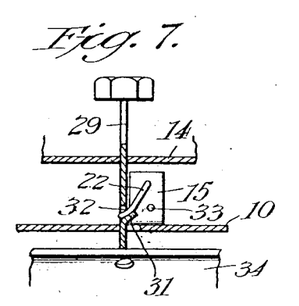
Figures 8, 10, 11:
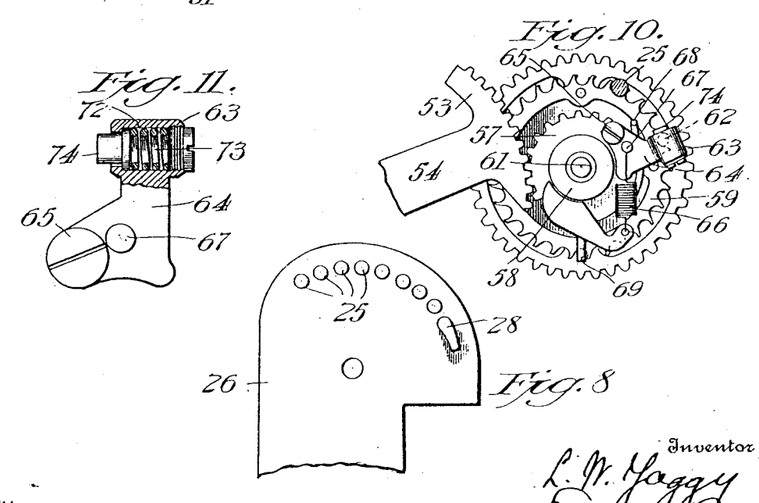
Fig. 8 is a partial side-elevation of a detail, a standard through which the stop-rods play.
Figs. 9, 10, 11 are details of the pinion, ratchet and driving gear mechanism.
Figure 9:
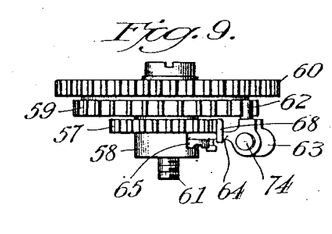

Lying beneath the inner edge of the foot of each one of a transverse series of key-bars, arranged in groups of three, is a rocker-plate 34, each plate being pivoted on the end in the standards 5 and 6. Each of two of the plates 34 has a series of perforations 35, to better enable a ready operation of the bottom edge of a key-bar upon a plate; because of the forward location of the other plate I find it expedient to provide a modification, soon to be described, for the "1" and "2" key-bars. The foot of a key-bar lies across the front edge of each plate 34. This arrangement permits a pivot at one side of each end of the plate while the plate is operated by the pressure of the key-bar on the edge of the opposite side of the plate. The foot of the key-bar taking over the edge of the plate 34 at the perforation 35 gives an easy and almost frictionless action. The foot of the key-bar turning thus at the perforated point moves in an arc so that a quick, constant and even movement is given to the plate (Figs. 4–7). In Fig. 5 I have shown modifications of structure which also carry out this idea. For key 1 I provide a loop-extension 36 and for key 2 a similar extension of different form 37, to give the forward keys, that is, those nearest the transmitting devices, a somewhat more delayed action. Each plate is spring pressed as shown at 38.

Each plate has a rocker-arm at one end, and, as all of these are of different lengths, I have indicated them by the different numerals 39, 40, 41. Each rocker-arm has a pin 42, 43, and 44 and each rocker-arm has on each end a pivot pin 45.

46 is a slide-bar, drawn by a spring 47 secured to the forward end of the slide-bar and a pin on the side of the machine.

48, 49 and 50 are slots in the slide-bar 46, and 51 represents the head of the slide-bar (Fig. 2). A guide-pin 52 projects through the slot 48. The slots 49 and 50 receive, respectively, the pins 42 and 43, while the pin 44 takes against the head 51 of the slide-bar.

A sector-gear 53 is borne by an arm 54 journaled on a stub-shaft at 55 to the side plate 12. The sector-arm 54 bears at the bottom a pin 56 which supports the forward end of the slide-bar 46, serving also as a connecting pin through which the slide-bar operates the sector-arm and its gear segment.

57 is a mutilated pinion to be operated by the sector-gear 53. The pinion 57 has a hub 58 which serves as a collar to separate the pinion from the standard 26, and give a longer bearing to the pinion (Figs. 1, 2, 9, 10 and 11).

A disk with a ratchet ring 59 has secured to it a gear-ring 60, and the gear-ring, the intermediate ratchet, and the inner pinion are all borne by a stub shaft 61 which screws into the side of the standard 26. A pawl-pin 62, which engages the ratchet 59, projects from a head 63, on the outer end of an arm 64, which is pivoted at 65 to the mutilated pinion 57.

66 is a spring-return, secured to the pawl at one end to a pin 67 on the arm 64 and, in this example, at the other end projecting from the pinion.

68 is a stop-arm for the pawl to prevent it from riding too high on the ratchet, and 69 is a stop-pin projecting from the pinion to engage a fixed stop-pin 70 projecting from the standard 26, and positively stopping this pinion, pawl and ratchet mechanism at the end of an operation. A pawl 71 pivoted to the standard 26 serves to hold the ratchet and the attached gear-ring in the advanced position after an operation of the parts.

The head 63 of the pawl is to strike one of the projecting stop-rods 25. It is, therefore, provided with a cushion. The head is hollow as indicated at 72, and carries a spring 73 against which abuts a plunger 74.

As has been previously indicated, the slide-bar 46 is suspended and guided at one end by the slot 48 and the pin 52. At the other end it is suspended and guided by the pin 56 on the arm 54 of the sector-gear 53. This pin serves also as the connecting means by which when the slide-bar 46 is reciprocated the sector-gear 53 will be oscillated. The pins 42, 43 and 44 of the rocker-arms 39, 40 and 41 lie, as indicated, respectively, in the slots 49 and 50 and against the head 51 of the slide-bar 46. The rocker-arms 39, 40 and 41 are of different lengths because the movement of each is different. The slots in the slide-bar 46 are of sufficient size or length to enable, for example, the rocker-arm 39, nearest the front, to operate the slide-bar 46 without affecting the succeeding or next rocker-arm 40, while the end pin 44 of the rocker-arm 41 may push back the slide-bar without having any effect upon the other two pins 42 and 43 and their crank or rocker-arms 39 and 40 and consequently the corresponding pivoted plate 34. It is the function of the sector-gear 53 to sweep around the mutilated pinion 57 in accordance with the extent of movement given the slide-bar 46 which, of course, is dependent upon which of the plates 34 is rocked by the operation of a key-bar 29 and which of the rocker-arms 39, 40, 41, that is, the shortest, the next, or the longest one, is operated. The turning of the mutilated pinion 57, of course, carries with it through the pawl-pin 62 the ratchet 59 and the gear-ring 60, the gear-ring then engaging the gear which operates the counter wheels and other parts to be hereinafter described. It is the function of the pawl-head 63 to strike against the selected stop-rod 25 which has been thrown out by the same movement of the key-bar which has operated the slide-bar 46 and the segment sector-gear 53. On the return sweep, as stated, the pin 69 strikes the pin 70 so as to insure an accurate replacement of the parts. The specific construction of the ratchet disk and the gear-ring provides a light and yet strong mechanical movement, peculiarly fitted to the work to be performed, where all the power transmission is here converted, and the sudden stops are necessary for precision. It may be observed that in common with many other features of this machine the parts of this operative mechanism may be variously arranged. For example, the stop 69, the projection for the spring-return and similar features may be made integral with the mutilated pinion. The distinctive purpose of this arrangement of the pawl on the mutilated pinion 57 is that when the sector-gear 53 operates the mutilated pinion 57 the action of the pawl 62 in relation to the center of movement shall be such that the tendency will be to draw the pawl pin 62 into the corresponding tooth of the ratchet 59 and thus prevent any possibility of the pawl leaping forward or missing the tooth for which it is intended. This precaution is necessary because of the sudden stoppage of the mechanism as indicated. In other words, the center of force exerted bears such a relation to the pawl that, no matter how it is operated or how it is stopped or how easily but vigorously the force is applied, the tendency is to draw in the pawl toward the center of motion instead of giving it a centrifugal action or throwing it away from the center of action. Ordinarily, in any movement similar to this, the centrifugal tendency is to throw out the pawl from its engaging position. In this case the very difficulties of sudden moving and sudden stopping are made advantages in securing an accurate and positive engagement of the pawl with the teeth of the mutilated pinion, because the force exerted gives a centripetal instead of a centrifugal effect. The arrangement illustrated also enables another accurate action. The pawl-pin 62 on the return movement must stop precisely at the determined point, and, preferably, just rising from or partly lifted out of the tooth-space so that the next operation may take place instantly and without any lagging or hanging of the pawl.

75 and 76 are side plates screwed to the base plate 1 of the machine and serving as bearing and journal plates for the counting and printing devices.

77 is a bracket which is secured to (it may be integral with) the side plate 75.

78 is a shaft passing through an opening in the plate 75 and journaled at one end in the plate 76 and at the other end in the bracket 77.

79 is a pinion secured through a collar 80 to the shaft 78. Secured to the same shaft through a sleeve 81 is a master wheel 82, having its teeth beveled at each side as indicated, so that it may readily be moved across a line of center gear wheels 83. Each of the center gear wheels 83 meshes with the teeth 84 on the side of a counter-wheel 85 and with a gear-ring 86 on the side of each of a series of printing wheels 87 (Figs. 1, 2, 3, 13, 15–18, 22).

Each center gear-wheel is borne by a separate hub 88 turning on a shaft 89 journaled in the side plates 75 and 76, and mounted on the hubs 88 are a series of comparatively small mutilated or interrupted gears 90, which, as hereinafter described, are the mediums through which the counter wheels and printing wheels may all be brought to zero.

Each counter wheel has on the side opposite the teeth 84 a disk bearing two teeth 91, the space between the two teeth being immediately opposite the figure 1. The teeth 84 and the teeth 91 have just sufficient clearance to pass each other without contact. That is to say, the space between the wheels is such that the teeth 84 on one side of a wheel may pass without contact or engagement, the teeth 91 on the opposite and facing side of the adjacent wheel.

A set of spur-wheels 92, which, because of their function, are termed coupling-wheels, and a single tooth-sector 93 at the units end, lie in front of the counter-wheels. Each wheel 92 has alternating teeth of different widths, 94, 95. The comparatively narrow teeth 94 can enter the space between two of the counter-wheels, but the wider teeth 95 cannot enter that space. Therefore, the wheels 92 are locked until the space between the two teeth 91 come into register with a wide tooth 95. This registry is occasioned by the upper of the teeth 91 contacting with the narrow tooth of the coupling-wheel. The wide tooth entering the space makes a connection between the previously moved counter-wheel and the succeeding counter-wheel of a higher denomination just as the number "9" is reached, so that the continued movement of the first moved wheel of the lower denomination will carry over the wheel of the next denomination, that is, in the illustrated form, the wheel to the left.

Each of the coupling-wheels 92 is independent. On one side of each of the wheels is a hub 96 bearing a pin 97 which lies in a cam-slot 98 of a cam-lever 99 pivoted upon a shaft 100 and extending beyond the shaft and having a spring 101 tending to keep each wheel 92 in constant engagement with the corresponding counter-wheel. Two rods 102 and 103 extend across the machine in such position that when any of the coupling-wheels 92 is moved forward or away from the counter-wheel one of the wide teeth of the coupling-wheel will pass in between these two rods so as to hold the wheel against movement while in that position.

The cam-slot 98, as illustrated, has a dwell at each of the positions, top and bottom, so that it is impossible for any pressure brought to bear directly upon a coupling-wheel to move the wheel in relation to the counter-wheel. The cam-levers 99 are operated individually as the carriage 107 is slid along, and the effect is completed by the action of the parts which connect this controlling mechanism of the counter-wheels with the controlling mechanism of the printing levers, which will be more fully set forth after the printing mechanism is described.

A shaft 104 is journaled at one end in the side plate 75 and at the other end, for reasons which will appear, in a bracket arm 105 extending out from the side plate 76. On this shaft is sleeved, as indicated, at 106, a carriage 107 having various devices for controlling the action of the counter-wheels and the coupling-wheels (Figs. 3, 13, 15–18).

Figure 15:
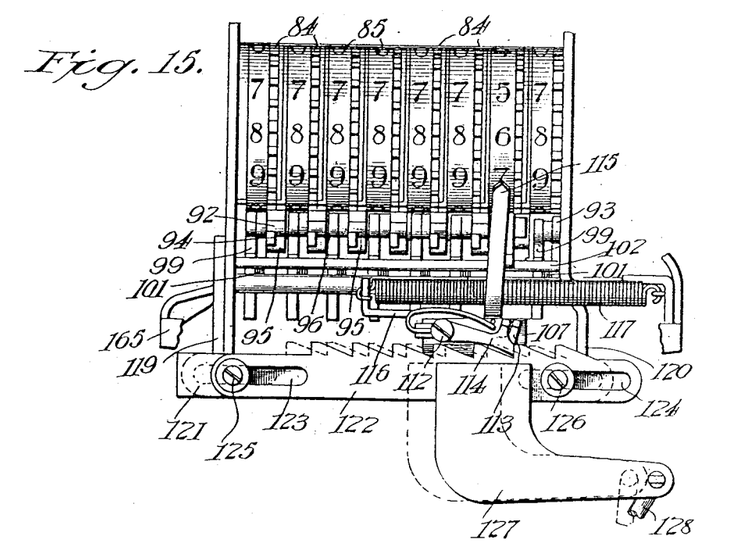
Fig. 15 is a partial plan view of the counter-wheels and their controlling mechanism.
Figure 16:
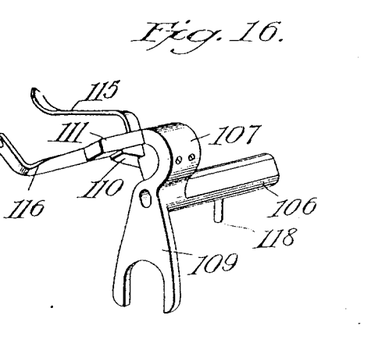
Fig. 16 is a detail plan of the carriage.
Figure 17:
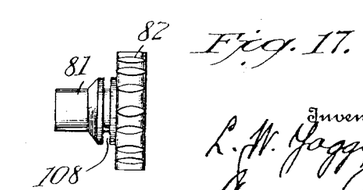
Fig. 17 is a side elevation of the master-wheel and shifting groove or collar.
Figure 18:
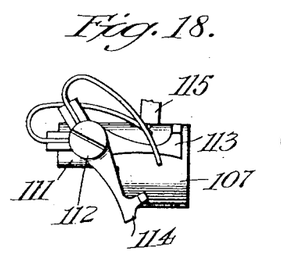
Fig. 18 is a detail elevation of the pawls controlling the carriage.

On the sleeve 81 at one side of the master-wheel 82 is a groove or a collar provision 108 (Fig. 16). A bifurcated shifting arm 109, extending from the carriage 107, embraces this groove or lies between these collars so that when the carriage is moved the master-wheel 82 will be moved, its specially formed teeth readily passing through the teeth of the center gears which operate the counter-wheels and the printing-wheels. The curved head of the carriage 107 has an inset piece with a beveled projection 109, and above this and extending out to one side of the head of the carriage a projection 111 to which is pivoted at 112 a pair of spring-pressed pawls 113, 114 (Figs. 15 and 18).

A pointer 115 projects from the carriage 107 and is so placed that its bent end may lie immediately in front of any selected counter-wheel. An arm 116, extending from one side of the carriage 107, provides an attaching point for a spring 117 which tends to draw the carriage and its parts over to the right. On the sleeve 106 is a pin 118 which, as will be hereinafter described, performs a function when the spring 117 sweeps the carriage over to the unit side.

Figure 1:
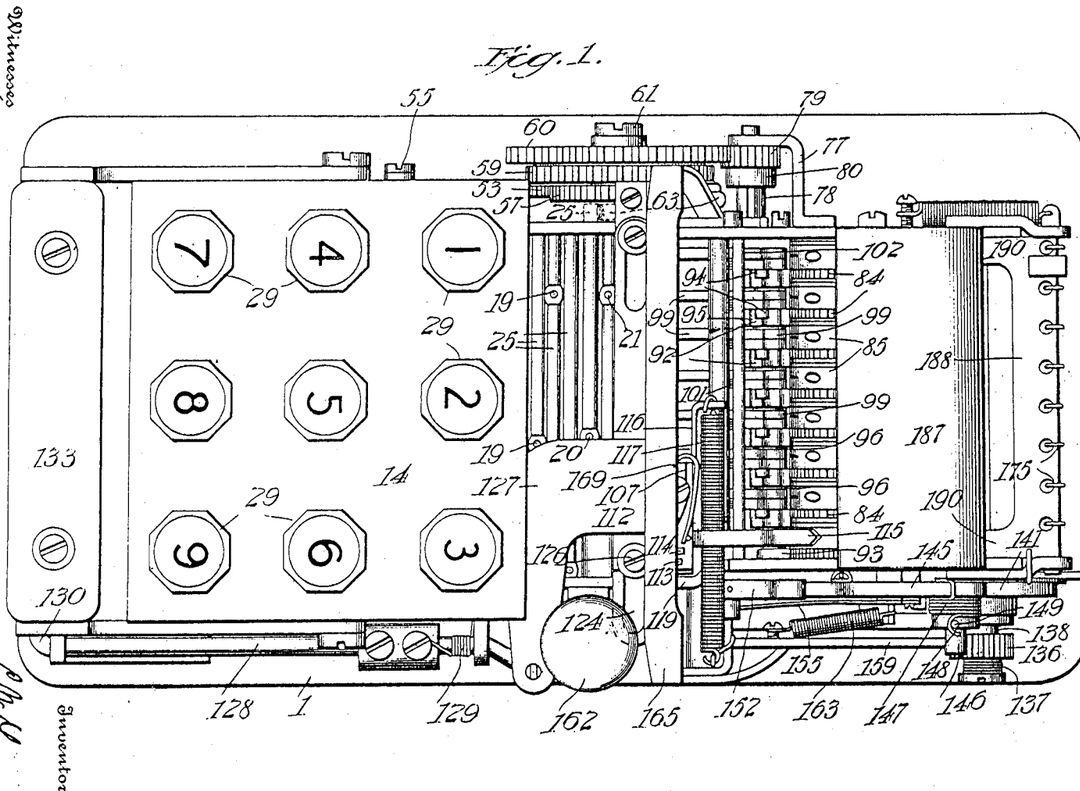
Figure 1 is a plan view with the casing removed.

Two bracket arms 119 and 120 project from opposite sides of the machine and carry a rack-bar 121 secured to them. Above and lying on the rack-bar 121 is a similar rack-bar 122, slotted at 123 and 124 and guided by pins 125, 126 which project up from the lower rack-bar. An arm 127 is secured to the upper rack-bar 122 (Figs. 2, 3, 12, 15). It is operated by a rock-lever 128 having a spring torsion connection at 129. The rock-lever 128 has a bent end 130 with a roller head 131, which lies beneath the horizontal plate of a pivoted frame 132, operated by a finger-bar 133 (Figs. 1, 3, 12). Each time the finger-bar 133 is depressed the rock-lever 128 will move the upper rack-bar 122 one step to the left. The pawl 114 will carry back the carriage, the attached pointer and the master wheel 82, the pawl 113 dropping into place behind the next tooth of the fixed rack-bar 121 and holding the parts in place.

Each movement of the carriage 107 brings it over one of the projecting spring-pressed coupling-wheel controlling arms 99, so that while the carriage remains in that position the opposite coupling-wheel 92 is held away from the corresponding counter-wheel and has one of its teeth locked between the rods 102 and 103, so that the wheel of lower denomination may not operate.

In the use of the machine the printing operation may follow the addition or not. It is, therefore, expedient to now describe the parts for returning the counter-wheels and the printing wheels to zero.

Figure 19:
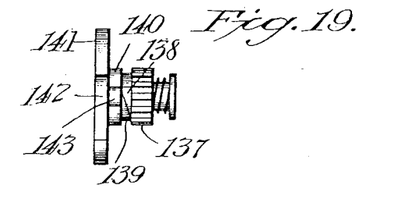
Fig. 19 is a detail of the clutches and pinion driving the zero-returning mechanism.
Figure 20:
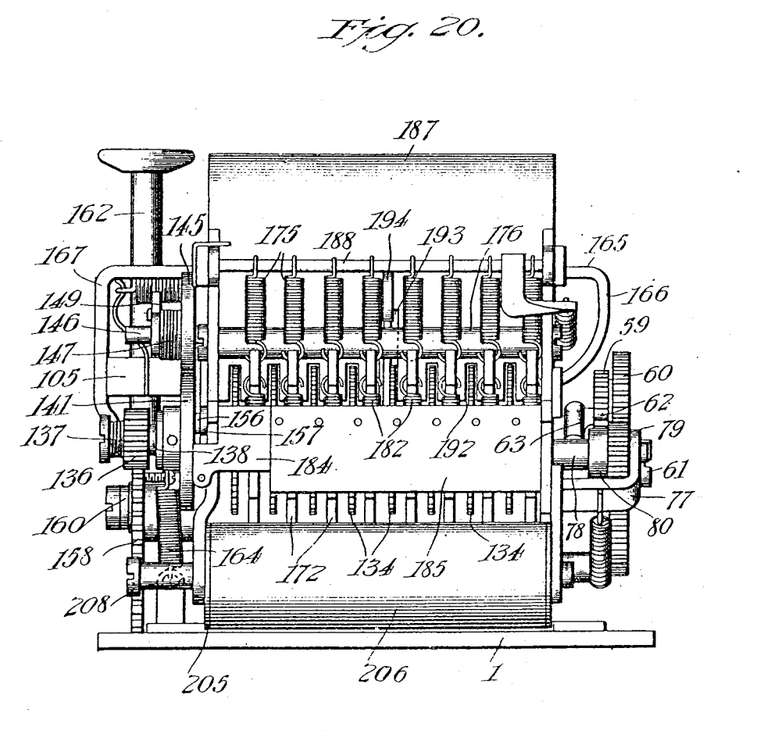
Fig. 20 is a rear elevation.
Figure 21:
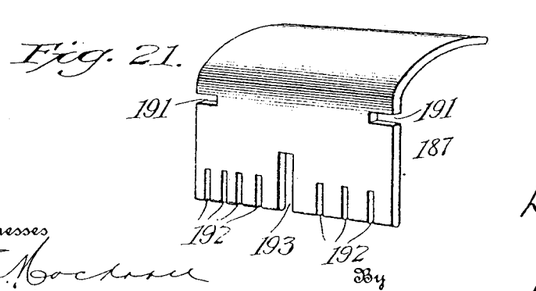
Fig. 21 is a detail of the printing plunger.
Figure 22:
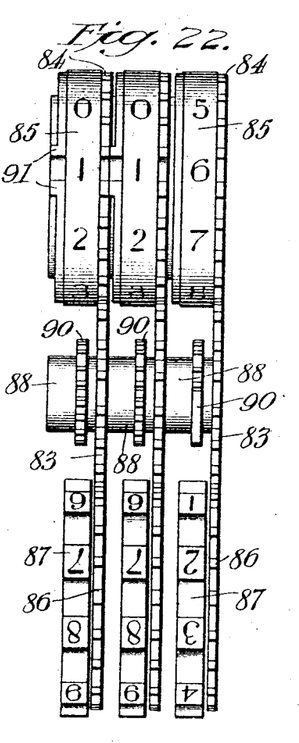
Fig. 22 is a detail plan of the counter-wheel, printing-wheels and associated gears.
Figure 23:
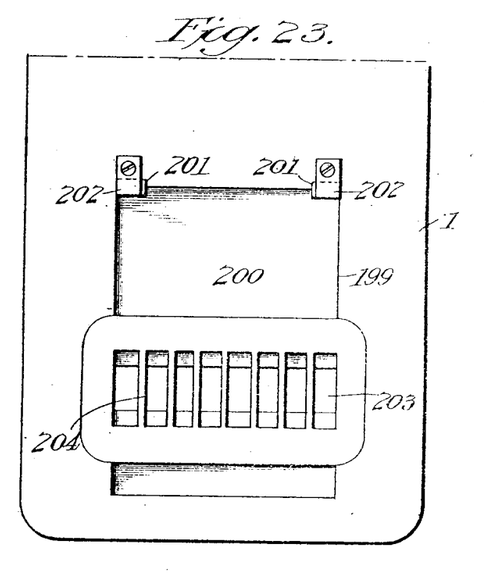
Fig. 23 is a bottom plan of the grated portion of the base.
Figure 24:
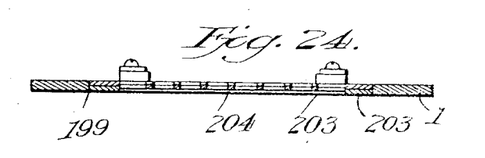
Fig. 24 is a section through Fig. 23.
Figure 25:
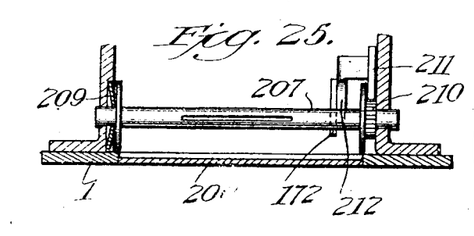
Fig. 25 is a transverse section of the bobbins.
Figure 26:
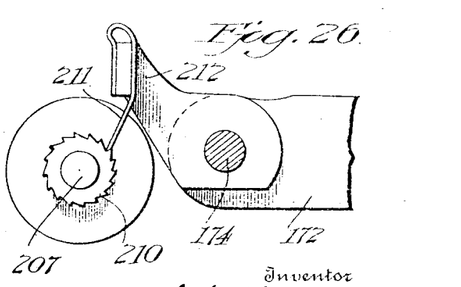
Fig. 26 is a detail of the bobbins ratchet mechanism.

A series of mutilated gears 134 mesh with the mutilated gears 90 of each center gear-wheel. The mutilated gears are twenty-teeth wheels with three of the teeth omitted. The gears 134 turn with a shaft 135 on which they are firmly mounted and which projects from the side of the machine and bears on its end a pinion 136. The pinion is pressed in by a spring 137 so that a clutch member 138 on the pinion may readily engage a clutch member 139 on a cam-hub 140 on the end of the shaft 137. The cam-hub 140 has a cam-disk 141 integral with it or secured to it. The disk has a depressed arc 142 and on its side a projection 143 with a cut or recess 144 in its inner face for a purpose to be hereinafter described (Figs. 12, 19, 20).

A bell-crank lever 145 is mounted upon a shaft 146 projecting from the side of the machine and has about it a spring connection 147 and in its hub a recess 148 receiving a pin 149 on the shaft, for a purpose to be hereinafter described (Figs. 1, 3, 12, 20). The operating arm of the bell-crank lever has a pin 150 to serve as a stop by striking against the projection 143 when the parts are returned after operation, the cut or recess 144 in the projection 143 permitting the pin 150 to pass the projection on the initial movement or operation. The curved arm of the bell-crank lever 145 has a round head 151 which takes into a corresponding recess in a rock-arm 152 pivoted at 153 to the projecting end of the shaft 100 and having a downwardly extending member 154 which, when the bell-crank lever has been operated to turn the shaft 100 and carry back all the coupling-wheels 92, will lie in front of a projection on the inner face of a spring catch strip 155 secured to the side of the machine and serving as a locking device for the coupling-wheels. The spring strip, as more fully described hereinafter, is released by the action of the pin 118 when the carriage 107 is brought over to that side of the machine by the action of its released spring.

On the inner side of the cam-disk 141 and secured to the operating arm of the bell-crank lever is an arm 156 which, by means of a loosely pivoted pawl 157, operates to release certain springs to be hereinafter described.

The pinion 136 is engaged by a gear-sector 158 on the end of an arm 159 pivoted at 160 to a stub-shaft in the side plate of the machine. The arm 159 is connected at 161 with a vertical finger-bar 162. Two springs, 163 and 164, serve, respectively, to restore to their normal position the bell-crank lever and the sector arm.

A bar 165 lies across the machine just above the carriage 107. One end is pivoted upon the shaft 104 by a bent extension 166 and the other end is pivoted upon the other end of shaft 104 by a bent arm 167 whose lower bent point lies in a slot 168 in the arm 159. The bar 165 is cut away upon its face adjacent the counter wheels as indicated at 169 so that it may not interfere with the action of the pawls 113, 114 (Fig. 1).

Figure 13:
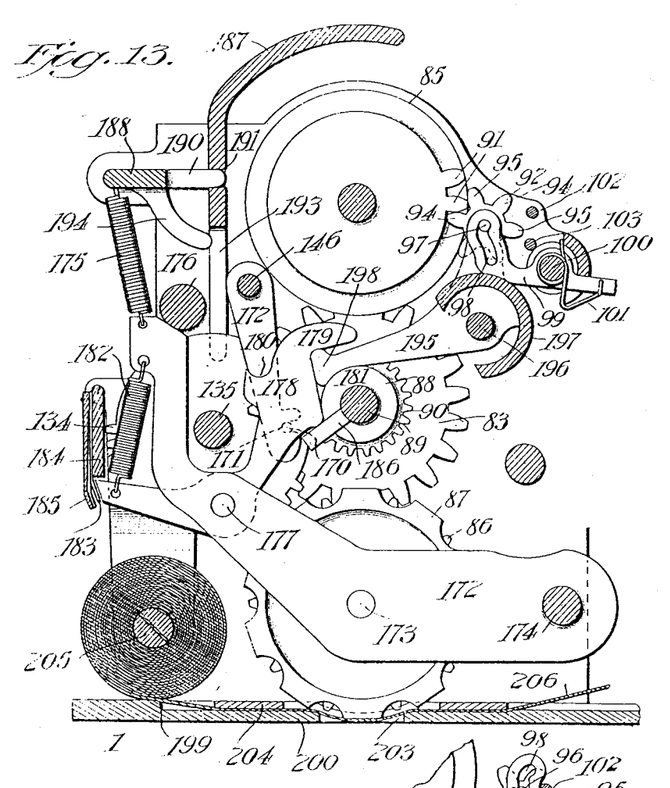
Fig. 13 is vertical section through the counter-wheel and printing-wheel division of the machine.
Figure 14:
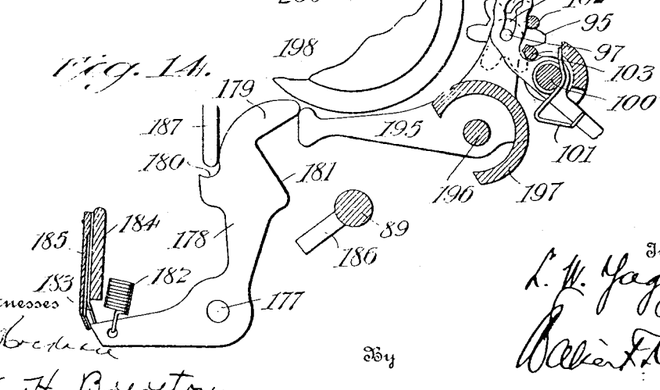
Fig. 14 is a detail showing another position of the coupling-wheel and the printing-lever mechanism shown in Fig. 13.

On one side of each of the wheels 83 is a pin 170 which takes into a notch 171 in an arm 172 the several arms depending from and being firmly mounted upon the shaft 146, the purpose being to lock the wheels when they have been returned to zero. The rotation of the shaft 149 frees the arms 172 from the pins 170 (Fig. 13).

While the locking-arms must yield, they must not yield so far as to give any chance for the pin 170 to throw back the arm too far and pass it. I have, therefore, provided the spring 147 to permit the yielding of the arms, while also providing the pin 149 on the shaft 147 and the recess 148 on the hub of the crank-lever to limit the movement of the shaft and the attached locking-arms to the extent required.

When the finger-bar 162 is depressed it carries down the front end of the arm 159 and throws up the sector-gear 158. This action rotates the pinion 136. As the pinion begins to turn the spring 137 forces the pinion in so that its clutch member 138 at once engages the clutch member 139. The mutilated gears 134 begin to rotate as soon as the clutch members engage. The disk 141 also turns in the direction of the arrow and the cam-face 142 presses on the operating arm of the bell-crank lever 145 so that the curved arm of the bell-crank lever rises and swings the rock-arm 152 across the projection on the inside of the spring-catch 155 (against which it normally lies) into engagement with the projection of the spring-catch. The effect of the movement of the arm 152 is to partially rotate the shaft 100 and the tube or shaft carrying the cam-levers and tipping the coupling-wheels. All these parts move as a unit, including the springs of the coupling-wheels. This locks all the coupling-wheels, their wide teeth projecting between the rods 102, 103. This is a necessary movement preliminary to turning back the counter wheels. In the meantime the counter-wheels and the printing-wheels have run back to zero. They are locked there by the fact that the pin 170 has been brought around by the rotation of the gear 83 until the pin enters the notch 171. When the pressure is removed from the finger-bar 162, the springs 163, 164 return the parts to their normal position in an obvious manner. In the operation of these parts, as previously indicated, the bar 165 plays it part. As the sector-arm 159 rises the point of the arm 167 of the bar 165 rides down the slot 168 in the arm 158. Just as the upward sweep of the sector is concluded the point of the arm 167 reaches the bottom of the slot 168 and turns back the arm 167 and throws in the bar 165, pushing back the pawls, 113, 114, and releasing the carriage 107 so that its spring sweeps it over to the units side ready for another operation, while, incidentally, the pin 118 strikes the spring-strip catch 155, forcing it out and releasing the member 154 of the bell-crank lever so that its spring may return it to normal position. Immediately, as indicated, the sector-arm is carried back by its spring, returning the bar 165 to its first position so that the pawls 113, 114 again come into play to hold and govern the carriage 107.

The printing-wheels 87 are carried by a series of printing or impression levers 172, each wheel having a short shaft 173 journaled in the adjacent lever, and each lever being pivoted on a shaft 174. The upper part of each lever 172 is drawn up normally by a spring 175. Across the machine runs a rod or bar 176 which serves as a stop for the several levers 172 (Figs. 3, 12, 13, 14, 20–26).

Pivoted to each lever 172 at 177 is a lever substantially a bell-crank lever, 178. One end of each of these setting-levers 178 has a hook-shaped top 179, an opposite crotch 180, and below the hook portion a fulcrum projection 181. The opposite or rear end is tied by a spring 182 to the hand of the corresponding printing-lever 172. The outer end of the lever 178 is beveled to fit against a correspondingly shaped flat spring 183, all of the springs being secured to a plate 184 extending across the machine, the plate 184 carrying also a guard-plate 185 which protects the projecting ends of the flat springs.

The hub of each of the mutilated gears 90 and the center gear-wheels bears a pin 186 which, as soon as the machine begins to operate, presses upon the fulcrum projection 181 and forces back the setting lever 178 so that the crotch 180 is carried over into line with a plunger 187. This plunger projects through the casing and is adapted to be easily removed to facilitate packing on the removal of the casing. A horizontal plate 188 reaches across the machine serving as a supporting means for the springs 175, and being itself under the tension of a spring 189. The plate 188 is pivoted in the side plates of the machine, and has at each end an extension 190 adapted to enter a notch 191 on each side of the printing plunger 187. The plunger 187 has also slits 192 which take over the mutilated gears 134, permitting the plunger to descend without interference with those parts. The plunger has also a slit 193 of larger size to receive the end of a curved arm 194 which extends downwardly from the plate 188. There may be, obviously, an arm on each side, if desired.

When the plunger 187 is inserted through the opening in the top of the casing the curved arm 194 enters the slit 193 and depresses the plate 188, causing the extensions 190 to enter the notches 191, thus making the plunger a spring-pressed plunger so that it may be returned after being struck. When the printing plunger is struck by the hand of the operator, its lower end enters the crotch 180 and carries down the lever 179 and thereby forces down the impression mechanism, that is, in the illustrated example, the printing lever 172 to printing position.

In case any of the counter-wheels are not rotated, but addition takes place by the operation of the counter of a higher denomination or in the column above the corresponding wheel 90 will not rotate to bring the pin 186 against the projection 181 of the setting-lever 178 which forces down the printing lever 172. The controlling mechanism of the counter-wheels is, however, as previously stated, closely related to the controlling mechanism of the printing-levers.

Each coupling lever is in reality pivoted in and carried by the head of a lever arm 195 itself pivoted at 196 and having an arc-shaped head turning for guidance in a corresponding slot of a bushing 197. Each lever 195 has a long arm 198 with a rounded head which lies immediately underneath the hooked portion of the corresponding setting-lever 178. If the carriage 107 should be moved past some of the counter-wheels, say the units and tens, because of zeros, each cam-lever 99 will have its projecting arm depressed and its slotted head raised, drawing over the corresponding coupling-wheel and tilting also the corresponding lever 195, so that its arm 198 will rise and push over the corresponding hooked portion of the setting-lever 178. This movement locks the cam-lever and the lever 198 and, incidentally, all of the parts are locked at the other end by the setting-lever catching beneath the bottom of the springs 183. The base of the machine is cut away at this part as shown at 199. Into the opening is set a comparatively thin plate 199, the plate being provided with lugs 201 which fit under lugs 202 secured to the base plate of the machine. The plate 200 has also an opening 203 and over that opening is fitted a grate 204 through the spaces of which operate the embossed or figured portions of the printing-wheel. A feeding spool 205 carries a ribbon 206 which passes over the opening 203 in the plate 200 and beneath the grate 204 and then upon a receiving or winding spool 207. The spool 205 has an extension 208 for winding, and a friction washer 209. A similar washer is provided for the spool 207. The spool 207 has a ratchet wheel 210 which is engaged by a spring pawl 211 mounted on a projection 212 secured to one of the printing-levers 172. Each movement of a printing-lever rotates the winding bobbin one step.

The operations of the various features of the machine have been described. It will, however, be advantageous to recapitulate them. The machine is placed upon the book or paper containing the data. The addition proceeds in the natural manner, that is, by columns beginning with units. The key is struck, in accordance with the number to be added and each successive number is struck there being no necessity for keeping in mind anything but the single numeral indicating the key to be struck. As the key-bar descends it carries down the outer edge of the corresponding plate 34, rocking the arm 39, 40 or 41 in accordance with which key-bar is struck. If, for example, the key "8" is struck, the rock-arm 39 is operated, its pin 42 moving against the rear wall of the slot 48 of the slide-bar 46 and carrying it back. This movement is the fullest movement of the slide-bar but it does not affect the other rocking-plates because of the arrangement of the slot 49 with respect to the pin 43 and because of the fact that the pin 44 lies against the head 51 of the slide-bar. A similar but somewhat shorter movement is given the slide-bar by the operation of another key-bar, say "5", which brings the pin 43 against the rear wall of the slot 49; and a similar but still shorter movement may also be given by the operation of one of the upper key-bars, say "2", which brings the pin 44 against the head 51 of the slide-bar 46 giving it a slight rearward movement. All of these measured movements give an equivalent measured impulse to the sector-arm 54 which is pivoted as described, to the slide-bar 46. The action of the sector-gear 53 partially rotates the pinion 57 and this rotation through the pawl-pin 61 carries with it in a rapid movement the ratchet 59 and the gear-ring 60 until the head 62 of the pawl pin 61 strikes against the projecting end of a stop-rod 25 which has been thrown out in the path of the pawl by the operation of the key-bar upon one of the downwardly bent parts 22, 23 or 24 thus rocking a corresponding upwardly bent part 19, 20 or 21. When the ratchet and the gear-ring have made this movement, the pawl 71 catches and holds the ratchet and the attached gear in the advanced position until the release of the key-bar permits the spring 47 to carry back the slide-bar, and with it on the return movement the sector-gear 53, reversing the operation of the driving mechanism, the reverse movement being stopped by the pin 69 engaging the fixed stop-pin 70 on the standard 26.

The stop rod 25 has been placed in a position to exactly determine the rotary movement given the driving mechanism and therefore precisely determine the amount of rotation to be given the pinion 79, the master-wheel 81, the center gear-wheels 83 and, therefore, the counter-wheels 85 and the printing-wheels 87.

The description has proceeded on the basis of beginning to add with the units counter-wheel. However, in a case as, for example, where the units and tens columns are all zeros, the addition may begin on the hundreds column. In such an event, or wherever it is desired to advance the master-wheel 82 and carriage 107, the finger-bar 133 is struck, depressing the end 130 of the rock-lever 128 reciprocating the arm 127 and moving with it the rack-bar 122. The effect is, through the pawl 113, to move the connected carriage 107 one step to the left, from one denomination to another, the parts being held in each advanced position by the pawl 114 which engages the fixed rack-bar 121. The pointer 115 will indicate the chosen stopping place. Each movement, by means of the shifting arm 129, carries the master-wheel along from one center gear-wheel to the succeeding one. At the same time with each movement or forward step the carriage 107 moves over a cam-lever 99 depressing it and through the described operation moves back the corresponding coupling-wheel 92 out of engagement with the counter-wheel which has been passed so that there may be no movement given that counter-wheel by the action of the counter-wheel of the next higher denomination which is being operated.

As the counting operation proceeds, each time there is a movement from nine to zero by any counting-wheel the two teeth 91 bring their space into registry with one of the wide teeth 85 of the corresponding coupling-wheel 92 thus locking together these adjacent counter wheels so that they will move one step together for the obvious purpose of adding one to the higher denominations for each of the units of the lower denomination required to make one of the higher denomination. This operation as indicated has given an equivalent movement to each printing-wheel for each movement of a corresponding counter-wheel. Necessarily the first movement of the counter-wheel has a corresponding movement of the printing-wheel through the center gear-wheels 83. This first movement occasions the operation of the corresponding setting-lever 178 through the action of the pin 186 upon the fulcrum projection 181 of the corresponding setting-lever. In case any of the counting-wheels and printing-wheels should not be operated then, as described, the movement of the carriage 107 across the cam-levers 99 will set the corresponding levers 178. That is done by the action of the slot 98 upon the pin of each coupling-wheel 92, the effect of the movement of the pin along the cam-slot being to depress the lever 195 so that its arm 198 will rise and push over the corresponding setting-lever 179. Each of the setting-levers 179 in action is now caught beneath the end of the flat spring 175, locking them all in place so that the crotches 180 are in position to be engaged by the bottom of the spring-pressed plunger 187 when the plunger is struck by the hand of the operator. The effect of this action is to operate the impression mechanism, that is, to force down each setting-lever 178 and each selected printing-lever in action 172, thus making an imprint or impression of the sum of the addition upon the paper beneath the opening in the base of the machine which, if desired, may be the book or paper carrying the data which has been added by the machine. Incident to this operation are slight details which have been hitherto described, as for example the automatic action of the bobbin, etc., and the placing or replacing of the spring-pressed plunger 187. The printing having been done, the counter-wheels and the printing wheels are now simultaneously run back to zero ready for another operation. This is accomplished through the action of the finger-bar 162 which, when depressed, carries down the front end of the arm 159, throwing up the sector-gear 158, rotating the pinion 137, and through that action the shaft which carries the center gears 83. The mutilated gears 134 are provided so that whatever position of the parts these gears will pick up the mutilated gears 90 of which only three teeth are missing and sweep the center gear wheels 83 around carrying with them in a measured movement the counter-wheels and printing wheels, until the pins 170 catch in the notches 171 of the spring-pressed arms 172 mounted on the shaft 146. There is, however, a necessary initial movement. As the disk 141 turns in the direction of the arrow the cam-face 142 presses on the operating arm of the bell-crank lever 145 so that the curved arm of the bell-crank lever rises and swings the rock-arm 152 across the projection of the inside of the spring catch 155. The effect of the movement of the arm 152 is to partially rotate the shaft 100 and the tube or shaft carrying the cam-levers 99. As previously described this locks all the coupling-wheels, their wide teeth projecting between the rods 102, 103, permitting the counter-wheels, to turn without interfering. There is also incident to these movements the release of the setting-levers 178 from the spring-catches 183 so that the springs 182 may throw them back to the position illustrated in Fig. 13. Just at the end of the operation of returning to zero the sector-arm 169 operates the bar 165, carrying the bar 165 against the pawls 113, 114, releasing the carriage 107, permitting its spring to sweep the carriage over to the units side, the pin 118 striking the spring-strip catch 155 and releasing the member 154 of the bell-crank lever so that the springs 162, 163 may, in an obvious manner, return the parts, incidentally again locking the carriage 107 through the pawls 113, 114.

I claim:—

1. In an adding machine, the combination of a series of counter-wheels and a corresponding series of printing wheels, means for imparting synchronous rotation to the two series of wheels, impression mechanism for the printing-wheels, and means for putting the impression mechanism into operable position upon the initial movement of any counter-wheel.

2. In an adding machine, the combination with a series of counter-wheels and a series of printing-wheels, impression mechanism for each printing-wheel, means for controlling the action of the counter-wheels operating also to bring into operable position the impression mechanism corresponding to any unused counter-wheel of a lower denomination than any counter-wheel which has been operated.

3. In an adding machine, the combination of a series of counter-wheels, a series of printing-wheels, means for controlling the operation of the printing-wheels, and means for automatically bringing the controlling mechanism of the printing-wheels into operative position as soon as the first movement takes place in the units column of the counter-wheels.

4. In an adding machine, the combination with key-bars, counter-wheels and printing-wheels and their gears, of impression mechanism, setting-levers for the impression mechanism, and catches for holding the setting-levers in operative position.

5. In an adding machine, the combination with key-bars and counter-wheels and printing-wheels and their gears, of impression mechanism, setting-levers for the impression mechanism, and a spring-pressed plunger for depressing the setting-levers and the impression mechanism.

6. An adding machine having in combination a series of actuating gears, a series of counter-wheels, and a series of printing-wheels meshing with the actuating gears, and means for vertically moving such printing-wheels as are selected by the action of the gears.

7. An adding machine having in combination a series of actuating gears, a series of counter-wheels, and a series of printing-wheels meshing with the actuating gears, and means for vertically moving such printing-wheels as are selected by the actuating gears and also any intermediate printing-wheels.

8. An adding machine having in combination a series of actuating gears, a series of counter-wheels and a series of printing-wheels meshing with the actuating gears, one or more of the printing-wheels being vertically movable to print the totals.

9. In an adding machine, the combination of a series of totalizing counter-wheels and a corresponding series of vertically movable totalizing printing-wheels, means for imparting a synchronous rotation to the two series of wheels, and means for bringing the printing-wheels to the impression position to print the totals.

10. In an adding machine, the combination with key-bars, counter-wheels, printing-wheels, and their gears, of a mechanism to operate each printing-wheel to make an impression, a setting-lever for each impression mechanism, and means operated in unison with each counter-wheel to position a setting-lever.

11. In an adding machine, the combination with counter-wheels and operating means, printing-wheels and means to operate the printing-wheels to cause them to impress and controlling members for the impression means, of coupling-wheels and controlling means for the coupling-wheels, and an operative connection between the controlling-means of the coupling-wheels and the controlling members of the impression means.

12. In an adding machine, the combination of key-bars, counter-wheels and printing-wheels and their gears, means to operate the printing-wheels to cause an impression, setting-levers for the impression means, coupling-wheels controlling the inter-action of couples of the counter-wheels, each coupling-wheel carried by a lever in operative relation with a corresponding setting-lever.

13. In an adding machine, the combination with a series of counter-wheels, of a series of coupling-wheels and means for causing any one of the coupling-wheels to operate at a determined point two adjacent counter-wheels and means for returning to zero the counter-wheels comprising means for first moving all of the coupling-wheels out of the line of engagement with the counter-wheels.

14. In an adding machine, the combination of counter-wheels and their gears, coupling-wheels normally lying in engagement with the counter-wheels, a shaft carrying the coupling-wheels, means for rotating each counter-wheel to zero and connecting means for initially throwing all of the coupling-wheels out of engagement with the counter-wheels.

15. In an adding machine, the combination with counter-wheels and corresponding coupling-wheels, mutilated gears secured to the counter-wheels and corresponding mutilated driving-gears secured to a shaft, a pinion on the end of the shaft, a sector-gear engaging the pinion, a cam on the end of the shaft, a lever operated by the cam and serving to shift the coupling-wheels, and a locking device for all the coupling-wheels.

16. In an adding machine, the combination of a series of counter-wheels and a series of operating gears, of a shaft bearing a series of depending arms corresponding with the counter-wheels, pins on the operating gears adapted to take into notches on each corresponding arm, a pin connected with the shaft, and a recess to receive the pin to prevent a depending arm from springing back out of engagement with the pin on the operating gear.

17. In an adding machine, the combination of counter-wheels, corresponding coupling-wheels, a carriage, pawls for holding the carriage in position, zero-returning gears and driving mechanism therefor, an operating lever for the driving mechanism, a bell-crank lever operating to move the coupling-wheels out of engagement, a locking device for the coupling-wheels, and a lever arm connected with the operating lever and serving to release the carriage and permit it to release the locking device on the return of the carriage to the initial or unit position.

18. In an adding machine, the combination with key-bars, counter-wheels and their gears, of coupling-wheels for controlling the inter-action of couples of the counter-wheels, each coupling-wheel carried by a pivoted arm and each having a cam-lever which locks the coupling-wheel in either the operative or inoperative positions.

19. In an adding machine, the combination with counter-wheels and operating means, of a series of corresponding coupling-wheels, means for individually controlling each coupling-wheel and means for moving them collectively.

20. In an adding machine, the combination with counter-wheels and operating means including a carriage, of a series of independent coupling-wheels controlled by the movement of the carriage, and means for locking all the coupling-wheels released by the return of the carriage to the units position.

21. In an adding machine the combination with counter-wheels and operating means including a carriage, of a series of coupling wheels, a series of pivoted arms projecting into the path of the carriage, each arm having a cam-path serving to lock a coupling-wheel first in one position and then in another position through the action of the carriage.

22. In an adding machine, the combination of a series of counter-wheels and a series of coupling-wheels lying normally in position to engage the counter-wheels, a carriage to move out of engagement successive coupling-wheels, and means for moving all of the coupling-wheels out of engagement position preliminary to the zero-returning operation.

23. In an adding machine, the combination of a series of counter-wheels, and a series of coupling-wheels, each coupling-wheel carried by a pivoted arm and each arm including a locking-device operating alternately to lock the coupling-wheel in the advanced and the retracted position with reference to the counter-wheels.

24. In an adding machine, the combination of counter-wheels, coupling-wheels, arms borne by a shaft and each carrying a coupling-wheel, each arm having a locking-device for each coupling-wheel, and means for locking at once all of the coupling-wheels.

25. In an adding machine, the combination of counter-wheels, coupling wheels, arms bearing the coupling-wheels and themselves borne by a shaft, each arm having a locking-device, a carriage comprising an operating arm traveling over the coupling-wheel arms and successively locking the coupling-wheels in retracted position.

26. In an adding machine, the combination of counter-wheels and a corresponding series of coupling-wheels, a shaft on which the coupling-wheels turn and to which they are tied by a spring connection, a carriage for successively turning the coupling-wheels on the shaft, and means for rotating the shaft and all the coupling-wheels.

27. In an adding machine, the combination of a series of counter-wheels and a series of coupling-wheels borne by a shaft, a bushing partly inclosing the shaft, each coupling-wheel having an extending cam-lever and a corresponding spring coiled about the shaft, one end bearing against the side of the bushing and the other end against the cam-lever, so that when the cam-lever is pressed the several parts act as a unit and no spring-pressure is required to be overcome when all the coupling-wheels are operated through the shaft.

28. In an adding machine, the combination of counter-wheels and their gears, a series of coupling-wheels, each coupling-wheel borne by a pivoted arm, a cam-lever operatively engaging each coupling-wheel and spring-pressed to keep its coupling-wheel movably against a corresponding counter-wheel, a carriage movable across the cam-levers and operating each to hold the corresponding coupling-wheel out of operative position.

29. In an adding machine, the combination of counter-wheels and their gears, a series of coupling-wheels, each coupling-wheel borne by a pivoted arm, a cam-lever operatively engaging each coupling-wheel and spring-pressed to keep its coupling-wheel movably against a corresponding counter-wheel, a carriage movable across the cam-levers and operating each to hold the corresponding coupling-wheel out of operative position, and means for moving all of the coupling-wheels out of and into engaging position.

30. In an adding machine comprising counter-wheels, printing-wheels and their gears, setting-levers for the printing-wheels, a carriage, and coupling-wheels controlling the counter-wheels, means for rotating to zero all the counter-wheels and printing-wheels, devices for locking the counter-wheels and printing-wheels and their gears at zero and means for simultaneously withdrawing the coupling-wheels, means for then releasing the carriage so that it may return to the units column, means for then replacing the coupling-wheels and withdrawing the locking devices, and means for then restoring the setting-levers to the initial or inoperative position.

31. In an adding machine, the combination with key-bars, counter-wheels and their gears, of a driving gear for operating the counter gear, a slide-bar operating the driving gear, differential connections between the slide-bar and the key-bars, and a series of stops operated by the key-bars to engage the driving gear.

32. In an adding machine, the combination with key-bars, counter-wheels and their gears, of a rotary mechanism operating the counter-wheel gears, transverse rocking-levers lying beneath and in the path of movement of the key-bars, a reciprocating part between the rocking-levers and the rotary mechanism, and a series of stops operated by the key-bars to engage the rotary mechanism.

33. In an adding machine, the combination with mechanism for operating counting or similar wheels, of a power-transmitting slide-bar, pivoted plates, key-bars to operate the plates, and rocker-arms of different lengths upon the several plates to reciprocate the slide-bar different distances in accordance with the impulse to be given the rotating mechanism.

34. In combination with counter-wheels and gears for rotating the counter-wheels, a mutilated pinion to transmit an impulse to the gears, a sector-gear to impart the impulse, a slide-bar to which the sector-gear is fulcrumed, and means for reciprocating the slide-bar different distances in accordance with the impulse to be imparted.

35. In an adding machine, the combination with counter-wheels, of nine key-bars arranged in transverse groups of three, a slide-bar and means for converting its reciprocatory movement to a rotary movement to operate the counter-wheels, and three connections of different degrees of movement by which the three groups of key-bars operate the slide-bar.

36. In an adding machine, the combination with key-bars, counter-wheels and their gears, of a driving gear for any of the counter-wheel gears, a sector-gear to operate the driving gear, a slide-bar to which the sector-gear is fulcrumed, and connections of varying extent of movement between sets of the key-bars and the slide-bar, and a stop for the driving gear operated by the key-bar before impulse is given to the driving gear.

37. In an adding machine the combination of key-bars, counter-wheels and their gears, a driving gear, a slide-bar operating the driving gear, and rocking plates having arms of different lengths connecting with the slide-bar and operated by the key-bars.

38. In an adding machine, the combination with key-bars, counter-wheels and their gears, of a driving pinion, a sector-gear meshing with the pinion, a slide-bar pivoted to the sector-gear, and rocking-levers operating the slide-bar and operated by the key-bars.

39. In a machine comprising counter-wheels and a driving-gear mechanism, a pinion engaging the driving gear, mechanism for oscillating the pinion, a ratchet-and-pawl mechanism for controlling the movement of the pinion, a series of key-bars and a corresponding series of stop-rods, standards having a series of perforations to guide the several stop-rods arranged with reference to the numerals on the counting-wheels, the stop-rods operating through the perforations and across the projected path of the pawl.

40. In an adding machine, the combination with key-bars, counter-wheels and their gears, of a driving gear for any of the counter-gears comprising a ratchet-disk bearing at its periphery a gear-ring and on its shaft a pinion, a series of stops operated by the key-bars to engage the ratchet-disk and a variably driven power-transmitting device between the key-bars and the pinion.

41. In an adding machine, comprising counter-wheels and driving gears, the combination with a slide-bar to impart motion to the driving-gears, of a pivoted plate and rocker-arms on the plate to operate the slide-bar, the plate having perforations at the edge, and key-bars engaging the plates between the perforations and the edge of the plate.

42. In an adding machine, the combination with key-bars, counter-wheels and their gears, of means for converting power derived from any of the key-bars into rotary movement to be imparted to any counter-wheel, comprising a shaft, a pinion on the shaft, a pawl carried by the pinion, a disk-ratchet engaged by the pawl of the pinion, a gear-wheel carried by the ratchet, a stop operated by the key-bar against which the pawl of the pinion strikes, a pawl holding the ratchet against retrograde movement, and a stop for the pinion.

In testimony whereof I have hereunto signed my name in the presence of two subscribing witnesses.

LEVI W. YAGGY.

Witnesses:
WILLIAM FERGUSON,
TIMOTHY DALY,